(12) United States Patent
Zandi et al.

(10) Patent No.: US 8,473,907 B1
(45) Date of Patent: Jun. 25, 2013

(54) COMPUTER PROGRAMMING ADAPTIVE ANALYSIS

(75) Inventors: Ahmad Zandi, Morgan Hill, CA (US);
Timothy M. Braje, Lafayette, CO (US);
Alexander King, Champaign, IL (US);
Susan Marie Kunz, Boulder, CO (US);
Darin Manica, Firestone, CO (US);
James W. Nash, Merrimack, NH (US);
Nathan Derrek Ryan, Boulder, CO (US)

(73) Assignee: Coverity, Inc., San Francisco, CA (US)

( * ) Notice: Subject to any disclaimer, the term of this patent is extended or adjusted under 35 U.S.C. 154(b) by 1223 days.

(21) Appl. No.: 12/183,988

(22) Filed: Jul. 31, 2008

Related U.S. Application Data

(60) Provisional application No. 60/953,077, filed on Jul. 31, 2007.

(51) Int. Cl.
*G06F 9/44* (2006.01)
*G06F 11/00* (2006.01)

(52) U.S. Cl.
USPC .......................... 717/120; 714/38.1

(58) Field of Classification Search
USPC .......................... 717/120; 714/38.1
See application file for complete search history.

(56) References Cited

U.S. PATENT DOCUMENTS

| | | | | |
|---|---|---|---|---|
| 5,729,746 A | * | 3/1998 | Leonard | 717/101 |
| 6,219,805 B1 | * | 4/2001 | Jones et al. | 714/38.1 |
| 6,895,577 B1 | * | 5/2005 | Noble et al. | 717/126 |
| 7,747,987 B1 | * | 6/2010 | Akarte et al. | 717/131 |
| 8,239,498 B2 | * | 8/2012 | Kilpatrick et al. | 709/220 |

OTHER PUBLICATIONS

Cahill et al., "The Java Metrics Reporter—An Extensible Tool for OO Software Analysis," Queensland University of Technology, 2002, 10pg.*
Coverity Inc., "Fixing Software on the Assembly Line," 2005, 27pg.*
Kaner et al., "Software Engineering Metrics: What Do They Measure and How Do We Know?" Metrics 2004, 12 pg.*
Yang et al., "Software Metrics and Visualisation," Univ. of Auckland, 2003, 30pg.*
Zandi et al., "Automating Software Audit: A Statistical Approach to Assessing Product Readiness," 2004, 6pg.*
"Automating Software Audit: A Statistical Approach to Assessing Product Readiness", *White Paper, Solidware Technologies*, (Accessed Aug. 12, 2008), 6 pgs.
"CAST Metrics White Paper", Castsoftware.com, (Accessed Aug. 12, 2008), 16 pgs.
"CAST Software Application Quality White Paper", Castsoftware.com, (Accessed Aug. 12, 2008), 12 pgs
"CAST Value White Paper", Castsoftware.com, (Accessed Aug. 12, 2008), 8 pgs.

(Continued)

*Primary Examiner* — Li B Zhen
*Assistant Examiner* — Ryan Coyer
(74) *Attorney, Agent, or Firm* — Schwegman Lundberg & Woessner, P.A.

(57) ABSTRACT

A method and apparatus for evaluating quality of a codebase is provided. The evaluation is provided by developing metrics, indicators, and indices for all levels of a codebase to provide indicators of quality and to enable identification of code blocks that need to be improved.

8 Claims, 13 Drawing Sheets

OTHER PUBLICATIONS

Halstead, M H, et al., *Elements of Software Science, Operating, and Programming Systems Series vol. 7*, New York, NY: Elsevier, ISBN:0444002057, (1977), 128 pages.

Hyatt, L, et al., "Software Quality Model and Metrics for Identifying Project Risks and Assessing Software Quality", http://sato.gsfc.nasa.gov/support/STC_APR96/qualtiy/stc_gual.html, (Apr. 1995), 23 pgs.

Oman, P, et al., "Construction and testing of polynomials predicting software maintainability", *Journal of Systems and Software*, 24(3), (Mar. 1994), 251-266.

Rosenberg, L, et al., "Software Quality Metrics for Object-Oriented Environments", http://satc.gsfc.nasa.gov/support/CROSS_APR97/oocross.PDF, (Accessed Aug. 12, 2008), 7 pgs.

Watson, A H, et al., "Structured Testing: A Testing Methodology Using the Cyclomatic Complexity Metric", *NIST Special Publication 500-235*, URL: http://hissa.ncsl.nist.gov/HHRFdata/Artifacts/ITLdoc/235/mccabe.html, (1996).

Welker, K D, et al., "Software Maintainability Metrics Models in Practice", *Crosstalk, Journal of Defense Software Engineering 8, 11*, (Nov./Dec. .1995), 19-23.

* cited by examiner

Hierarchy of Quality Indices and Quality Indicators

Drilldown from the snapshot level to explore indices and indicators in the code hierarchy.

Risk Drivers {Volume, complexity, Comments, Rules Violation, Testability}
unmaintainability Drivers {0man-Hagemeister Maintainability, which includes serveral underlying metrics}

Type {Class, Annotation, Interface, Enumeration} Nodes 11 results found, displaying 1 to 11

| Name | RISK | UNMAINT | VOLM | CMPLX | CMNT | VIOL | TEST | CVRG |
|---|---|---|---|---|---|---|---|---|
| AsiExtraField ~ 8041 | | 1.18 | 0.16 | 0.00 | 0.00 | 0.00 | 0.00 | 0.12 |
| ExtraFieldUtils ~ 8042 | | 1.75 | 0.15 | 0.00 | 0.00 | 0.00 | 0.00 | 0.01 |
| JarMarker ~ 8043 | | 0.95 | 0.04 | 0.00 | 0.00 | 0.00 | 0.00 | |
| UnixStat ~ 8044 | | 0.00 | 0.01 | 0.00 | 0.00 | 0.00 | 0.00 | |
| UnrecognizedExtraField ~ 8045 | | 1.04 | 0.04 | 0.00 | 0.00 | 1.46 | 0.00 | 0.01 |
| ZipEntry ~ 8046 | | 1.19 | 0.19 | 0.00 | 0.00 | 5.78 | 0.00 | 0.34 |
| ZipExtraField ~ 8047 | | 0.00 | 0.01 | 0.00 | 0.00 | 0.00 | 0.00 | |
| ZipFile ~ 8048 | | 1.55 | 0.40 | 0.00 | 1.45 | 2.50 | 0.00 | 0.46 |
| ZipLong ~ 8049 | | 1.04 | 0.07 | 0.00 | 0.00 | 0.00 | 0.00 | 0.45 |
| ZipOutputStream ~ 80410 | | 1.63 | 0.49 | 0.00 | 0.00 | 0.90 | 0.00 | 0.31 |
| ZipShort ~ 80411 | | 1.03 | 0.04 | 0.00 | 0.00 | 0.00 | 0.00 | |

FIG. 8

COMPUTER PROGRAMMING ADAPTIVE ANALYSIS

CROSS REFERENCE TO RELATED APPLICATIONS

This is a United States Patent Application that claims priority under 35 U.S.C. §119(e) to United States Provisional Patent Application titled "COMPUTER SYSTEM ARCHITECTURE ADAPTIVE ANALYSIS," (Ser. No. 60/953,077) filed on Jul. 31, 2007, which is incorporated by reference in its entirety herein.

FIELD

The present application relates generally to the technical field of evaluation of programming code.

BACKGROUND

In general, software are developed using a hierarchical structure. For example, the hierarchical structure may include functions or procedures at a lowest level, applications at a next higher level, packages at yet another higher level, and so on. A codebase is a collection of codes at the package level and all associated levels. One problem with developing codebase using the hierarchical structure is that it is difficult to identify design problems and to evaluate the quality of the codebase at the various levels.

SUMMARY

The features, utilities and advantages of the invention will be apparent from the following description of example embodiments as illustrated in the accompanying drawings.

BRIEF DESCRIPTION OF DRAWINGS

Some embodiments are illustrated by way of example and not limitation in the figures of the accompanying drawings in which:

FIGS. 3-9 include diagrams that illustrate examples of evaluation information displayed by an evaluation system, in accordance with some example embodiments.

DESCRIPTION

For some example embodiments, methods and systems for evaluation of quality of a codebase are disclosed. The evaluation of the codebase may be based on a hierarchical structure having multiple levels. One or more metrics and indicators may be used to evaluate the codebase at one or more levels. An indicator associated with a level may be natively defined at that level, or it may be defined based on indicators associated with lower levels.

In the following description, for purposes of explanation, numerous specific details are set forth in order to provide a thorough understanding of some example embodiments. It will be evident, however, to one skilled in the art that the present invention may be practiced without these specific details.

The methods and systems explained herein will be described in the context of an example hierarchical structure, but one of ordinary skill in the art will recognize that the methods and systems may be implemented using other example structures or in relation to other example embodiments. Any embodiment described herein is not necessarily to be construed as preferred or advantageous over other embodiments. Additionally, unless explicitly stated otherwise, any embodiment provided should be considered an example embodiment.

Structure and Levels

Figure 1:
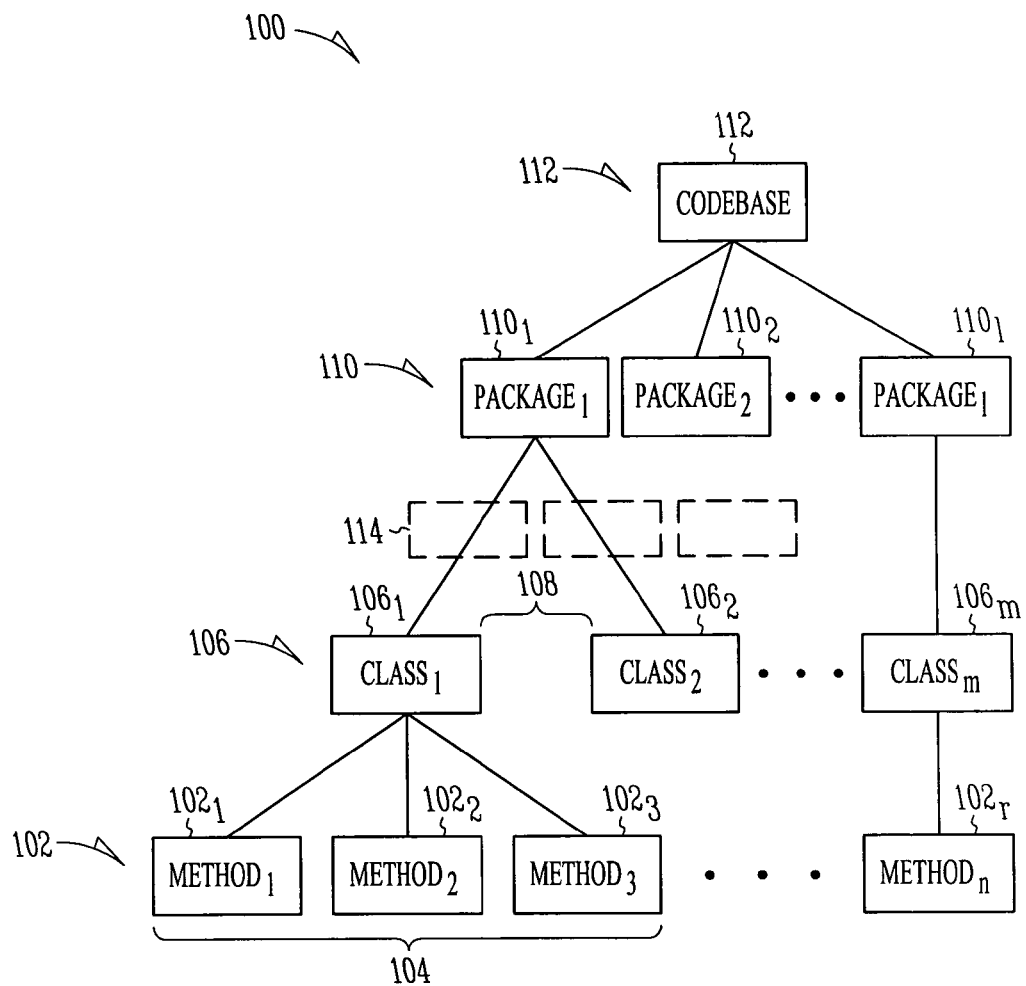
FIG. 1 illustrates an example of a structure hierarchy, in accordance with some example embodiments.

FIG. 1 is a block diagram that illustrates an example of a software structure, in accordance with some embodiments. Structure 100 may include multiple levels and may represent a logical hierarchy of a codebase. Each of the multiple levels may represent a different software functional level. Merely as an example, the terminologies associated with Java programming language are used. Referring to the structure 100, the bottom level is referred to as a method level 102. A level up from the method level 102 is referred to as a class level 106. A level up from the class level 106 is referred to as a package level 110. A level up from the package level 110 is referred to as a codebase level 112. One skilled in the art may recognize that the terminologies used for the different levels of the structure 100 may change when referring to software written using a different programming language. For example, when using C++, the levels may include a method level, a class level, a namespace level and a codebase level. Regardless of the programming language, the use of a logical hierarchy in software development may be similar. It may be noted that the logical hierarchy may correspond to a physical hierarchy which may include a file level, a directory level and a codebase level. The physical hierarchy is not specifically illustrated in FIG. 1, but is generally known in the art.

Referring to FIG. 1, the method level 102 may include one or more methods. The method level 102 may include method $102_1$ to method $102_n$. One or more of the method $102_1$ to the method $102_n$ may represent a specific implementation of an operation that can be executed in response to a request. For example, one or more of the method $102_1$ to the method $102_n$ may perform a particular function or application on a specific request.

The class level 106 may include one or more classes. In the example embodiment shown in FIG. 1, the class level 106 may include class $106_1$ to class $106_m$. Although the class level 106 includes a plurality of classes (e.g., $106_1$ to $106_m$), it should be noted that the class level 106 may include only a single class (e.g., class $106_1$).

The package level 110 may include one or more packages. In FIG. 1, the package level 110 is shown by way of example to include package $110_1$ to package $110_1$. Although the package level 110 includes a plurality of packages (e.g., $110_1$ to $110_1$), it should be noted that the package level 110 may include only a single package (e.g., (e.g., $110_1$).

For some example embodiments, a group of methods may form a class. For example, a group of methods 104 which includes the methods $102_1$, $102_2$, and $102_3$ may form the class $106_1$. In an example embodiment, the number of classes in the structure 100 may be less than the number of methods; however, that may not be a requirement. For some example embodiments, a group of classes 108 which includes the classes $106_1$ and $106_2$ may form the package $110_1$. In an example embodiment, the number of packages in the structure 100 may be less than the number of classes; however, that may not be a requirement.

The group of packages $110_1$ to $110_1$ may form the codebase 112, which may correspond to the structure 100 for some example embodiments. As one of ordinary skill in the art would recognize, the structure 100 may include multiple levels of similarly classified software functional blocks (or generically referred to as code blocks). For example, the structure 100 may include a second class level 114 (illustrated in dotted lines in FIG. 1). The second class level 114 may contain a grouping of one or more classes from the class level 106. As shown, a group of classes 108 may include the classes $106_1$ to $106_2$ from the class level 106. Although not shown, additional package levels may also be applicable.

For some example embodiments, metrics are used to evaluate quality of one or more logical modules of the structure 100. A logical module may be a method, a class or a package. Metrics are measurements or benchmarks that are typically objectively calculable. For example, one common metric includes counting the lines of code (LOC) for a method. The metrics may be used to help software developers avoid releasing software packages that may have less than desirable quality.

Metrics

Figure 2:
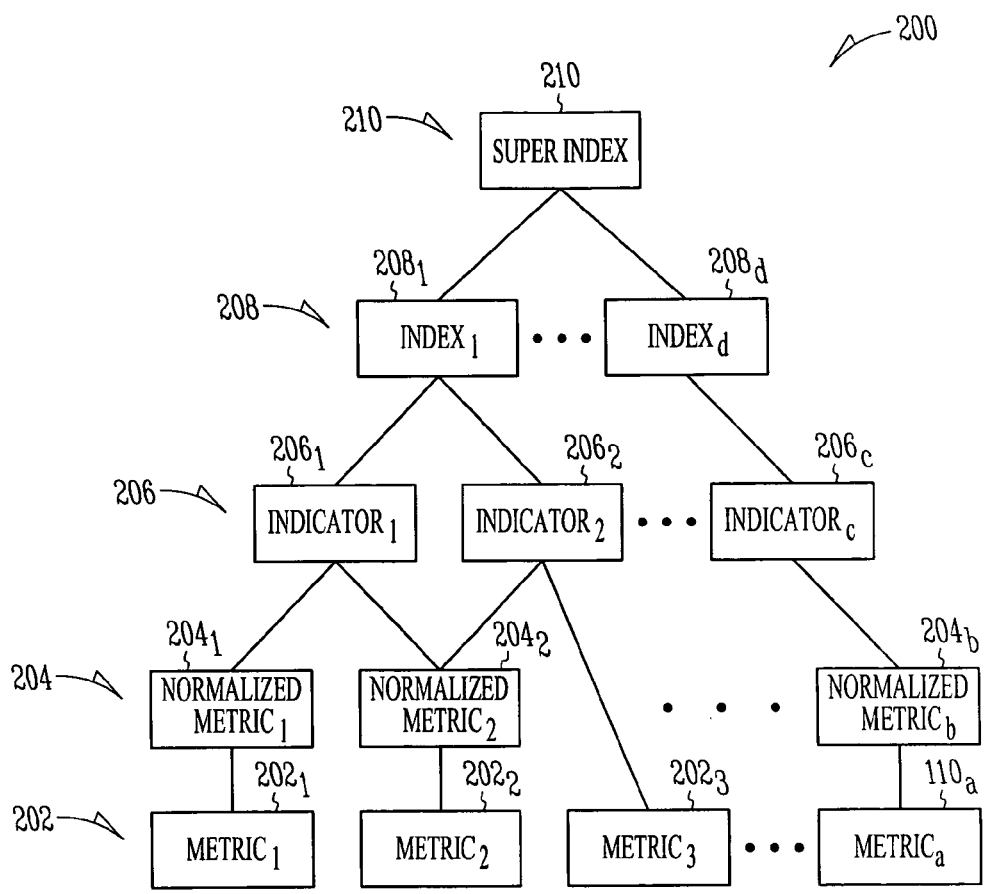
FIG. 2 illustrates an example of an evaluation hierarchy, in accordance with some example embodiments.
Figure 3:
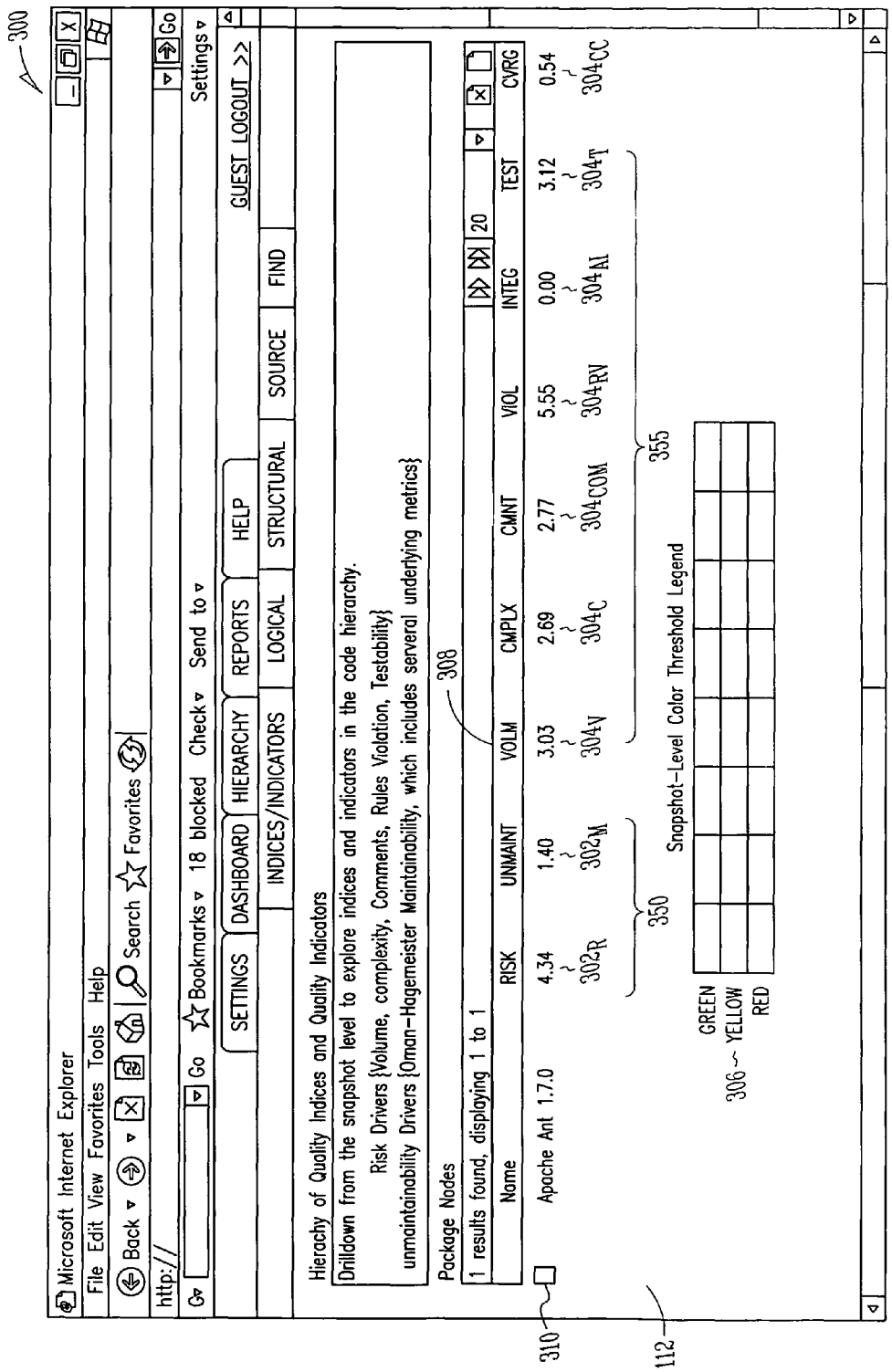

FIG. 2 is a diagram that illustrates an evaluation hierarchy, in accordance with some example embodiments. Evaluation hierarchy 200 may comprise multiple levels. At the bottom level of the evaluation hierarchy 200 are metrics. This bottom level is referred to as metric level 202. A level of the evaluation hierarchy 200 may map to one or more levels of the structure 100. For example, a metric may be defined for each of the levels of the structure 100.

In the example shown in FIG. 2, there are metrics $202_1$ to $202_a$. Each of the metrics $202_1$ to $202_a$ may relate to some objectively measurable or calculable characteristic of a logical module. When using Java, a logical module may correspond to a method, class, package, codebase as described in the example structure 100 of FIG. 1. As mentioned above, possible metrics may include a calculation of the LOC contained in a method, a calculation of a number of lines of comment (LCOM) contained in a method, a calculation of the number of nested loops in the method, a calculation of the number of lines of Javadoc comments. Javadoc comments generally start with the character string "/**" and end with the character string "*/", as is known to one skilled in the art. For example, the method $102_1$ may have 200 lines of code; the class $106_2$ may contain 67 nested loops, etc. A more detailed description of different metrics is described below.

Normalized Metrics

The metrics may be normalized to generate normalized metrics which may provide a more subjective evaluation of quality. As illustrated in FIG. 2, the evaluation hierarchy 200 includes multiple normalized metrics $204_1$ to $204_b$ at level 204 which is above the metric level 202. The level 204 may be referred to as normalized metric level 204. For some example embodiments, the metrics may be normalized based on industry standard information. For example, a desirable number of LOC for a method may be no more than 75 (e.g., an upper bound number of LOC for a method). As such, a method having 150 LOC would have a metric of 150 and a normalized metric of 2 (or 150/75). Similarly, a method having 25 LOC would have a metric of 25 and a normalized metric of ⅓ (or 25/75). It may be noted that the metrics may be normalized based on information other than the industry standard information or both. Referring to FIG. 2, the metrics $202_1$ to $202_2$ may be normalized into normalized metrics $204_1$ to $204_2$.

For some example embodiments, a method associated with a higher normalized metric is considered to be of lower quality than a method associated with a lower normalized metric. Thus, in the above examples, the normalized metric of 2 is lower or worse than the normalized metric of ⅓. However, those examples are described in this manner for convenience. It may be noted that the normalized metric and the related quality evaluation corresponds to the portion (e.g., a method) of the codebase that is measured.

For some example embodiments, not all metrics are associated with normalized metrics. For example, as shown in FIG. 2, the metric $202_3$ is not associated with a normalized metric. As can be appreciated, the LOC metric is objective and may be a simple counting of the lines of code, whereas the normalized metric is related to a subjective determination. As an example, the subjective determination for the LOC is that an upper bound of 75 may be acceptable. It may be noted that although the normalized metric examples relate to linear scaling, non-linear scaling may also be possible.

As described above, a metric may provide an objective or calculative evaluation of a feature such as a method, a class, a package, or a codebase. However, a normalized metric may provide a better evaluation for the codebase. As can be appreciated, the normalized metric may provide a first type of subjective evaluation of a method, a class, a package, or a codebase.

Indicators

As illustrated in FIG. 2, the evaluation hierarchy 200 includes multiple indicators $206_1$ to $206_c$ at level 206 which is above the normalized metric level 204. The level 206 may be referred to as indicator level 206. For some example embodiments, an indicator may be defined natively at a level. One or more metrics may be combined with one or more normalized metrics to form an indicator. The indicator may be used to provide quality measurement regarding a particular method, class, package, or codebase. As an example, the evaluation hierarchy 200 includes indicators $206_1$ to $206_c$ which are formed using various metrics and/or normalized metrics at the metric level 202 and at the normalized metric level 204.

The indicators may be defined at each level. For some example embodiments, indicators formed from one or more metrics may be referred to as type A indicators. The type A indicator may be formed by one single metric that may be normalized using static values or other metrics. The following is an example formula that may be used to define a type A indicator based on a cyclomatic complexity metric (as described below) at the basic level (e.g., method).

$$I_c(M) = CYC(M)/C_0 \qquad \text{(Formula 1)}$$

where $I_c$ is an indicator, M is a method and $C_0$ is a number around 11.

The following is another example formula that may be used to define a type A indicator based on lines of code (LOC) and lines of Javadoc ($J_{doc}$) metrics:

$$I_{Jdoc} = LOC/(\gamma(J_{doc}+1)) \qquad \text{(Formula 2)}$$

where $I_{Jdoc}$ is an indicator formed of two metrics, LOC and $J_{doc}$, for a given method, where LOC is the line of code in the method, J is the lines of Javadoc in the method and γ is a constant.

For some example embodiments, the indicators formed from a combination of other indicators may be referred to as type B indicators. It may be noted that although the type B indicators are not specifically illustrated in FIG. 2, they may be similar to the indices $208_{1-d}$ at a level above the indicator level 206.

An index at the index level 208 may be constructed from a number of indicators independently at every level. For a hierarchy level M, let $I_1, \ldots, I_n$ be the n indicators participating in the index under consideration. Let weights $w_1, \ldots, w_n$ be selected for participating indicators and a number m≦n be fixed. The index $I_n(M)$ where M is a module is defined as the sum of the largest m values of the n set $\{w_1I_1, \ldots, w_nI_n\}$. It may be noted that the weights can be level dependent.

A combination of all the evaluation processes from the lower levels of the evaluation hierarchy 200 may result in an overall evaluation at the top level 210 (also referred to as a super index level).

A type B indicator may be formed from several type A indicators. A type B indicator may be defined successively from a set of other type B indicators. The value of the final indicator may be dependent on the order that the participating indicators are employed in the computation. Given a set of type A indicators I1, I2 and I3, a type B indicator I may be defined by successively defining I12 from I1 and I2 followed by defining I123 from I12 and I3, and so on. When defining a type B indicator I using a pair of indicators $I_1$ and $I_2$ and their possible values, the possible resulting value for the indicator I is also dependent on the relationship of the two indicators, i.e., whether they reinforce badness or not. The following table shows the two main cases:

TABLE 1

| I1 | I2 | I12 (case 1) | I12 (case 2) |
|---|---|---|---|
| Bad | Bad | Bad | Bad |
| Bad | Good | Bad | Good |
| Good | Bad | Bad | Good |
| Good | Good | Good | Good |

For some example embodiments, the type B indicators may include a volume indicator that is defined at a basic level using two type A indicators. For example, the basic level may be the method level. The two type A indicators may include an $I_1$ indicator associated with a LOC metric and an $I_2$ indicator associated with a Halstead length metric. More description about the Halstead length metric is described below. For example, the resulting type B indicator $I_{12}$ may correspond to the case 1 illustrated above in the Table 1. Since it is required that both of the type A indicators $I_1$ and $I_2$ are associated with Good values, the resulting type B indicator $I_{12}$ may also be associated with a Good value. As described above, a low value may be interpreted as a preferred or Good value, and a high value may be interpreted as a non-preferred or Bad value. The following is an example formula that may be used to define a type B indicator based on two or more indicators:

$$I_{12} = I_1 + I_2 - R\sqrt{I_1 I_2}, \quad \text{(Formula 3)}$$

where $I_1$ and $I_2$ are two different indicators, and where $0 \leq R \leq 1$ with R being a correlation factor (described below).

For some example embodiments, the type B indicators may include a comment indicator that is defined at a basic level using two type A indicators. For example, the basic level may be the method level. The two type A indicators may include an $I_1$ indicator associated with lines of comment (LCOM) metric and an $I_2$ indicator associated with lines of Javadoc. For example, the resulting type B indicator $I_{12}$ may correspond to the case 2 illustrated above in the Table 1. When a software package is designed such that either of the type A indicators $I_1$ and $I_2$ are associated with low values, the resulting type B indicator $I_{12}$ may also be associated with a low value. Following is an example formula that may be used to define a type B indicator based on two or more indicators:

$$I_{12} = \frac{I_1 I_2}{I_1 + I_2 - R\sqrt{I_1 I_2}} \quad \text{(Formula 4)}$$

where $I_1$ and $I_2$ are two different indicators, and where $0 \leq R \leq 1$ with R being a correlation factor. The term R in the Formulas 3-4 may be added to reduce the impact of double counting when two indicators are highly correlated. The value used for R may be implementation-dependent. It may be noted that the Formulas 1-4 are exemplary and should not be understood to be limiting because the metrics and the indicators (both type A and type B) may depend in part on the codebase 112.

Roll Up

As described above, an indicator may be defined natively at a level. For some example embodiments, indicators defined at lower levels may be pushed-up or rolled up into a higher level to enable defining an indicator at the higher level. For example, an indicator at the class level 106 may be rolled up to another higher class level 114 or to a package level 110, etc. For some example embodiments, when an indicator is also natively defined at a higher level, the indicators from the lower level and the natively defined indicator may be combined to define the indicator at that higher level. For example, when there is an indicator defined natively both at the method level 102 and the class level 106, then at the class level 106, the two indicators may be combined forming a rolled-up indicator for that class.

Recursive Roll Up

An element of the evaluation hierarchy 200 containing only elements of lower levels in the evaluation hierarchy 200 may be referred to as a simple element. An element that contains elements of the same level of the evaluation hierarchy 200 may be referred to as a compound element. For example, a class that only contains methods is a simple class, while a class containing another class is a compound class. A compound class may or may not contain any methods. Referring to FIG. 1, the class $106_1$ (or class$_1$) is an element. Similarly, the method $102_{1d}$ is an element. The class $106_1$ of the class level 106 contains three methods $102_1$ to $102_3$ (or method$_1$, method$_2$, and method$_3$) of the lower method level 102. Assuming that an indicator under consideration is dependent only on metrics defined natively at the method level 102, the indicators may be rolled up from all the elements at the method level 102 (method$_1$, method$_2$, and method$_3$ contained in the class$_1$) to the class$_1$ provided that class is a simple element (i.e., class$_1$ does not contain other class elements).

For some example embodiments, when a class element contains other class elements (as in situations of compound elements), the rolled-up process may be performed recursively. For simplicity, the methods of the method level 102 may be referred to collectively as M, and the classes at the class level 106 may be referred to collectively as C. In recursive roll up, after an indicator is defined for a simple element (e.g., class element $106_1$), the indicator is defined for an element that only contains M elements and simple C elements and so on until it is defined for a class C in general.

Roll-Up Arithmetic

The roll-up process may be used to extend an indicator from one evaluation hierarchy level to a next higher evaluation hierarchy level. As described above, when an indicator I is also natively defined at a level, then, in addition to the rolled-up indicator from the lower level, the indicator defined natively may also need to be factored in to determine the indicator at that level.

The following is an example that demonstrates one embodiment of how an indicator may be defined. Let S be a set of elements that is contained in a class (e.g., class $106_1$). The elements may be in the same level as the class or they may be in a lower level. It may be noted that, for simplicity, a class is used; however, other components of the hierarchy structure may also be used. Let S be a set of methods and classes that are either immediate children of or contained in a class. Let T the a given threshold, and let S' be a subset of S containing all the elements s with $I(s) \geq T$. In addition, the following definition may also be used:

μ the mean of the I values over the set S'

σ the standard deviation of the I values over the set S'

$0 \leq \rho \leq 1$ the ratio of the number of elements of S' to S

For some example embodiments, the rolled-up part of the indicator at a C level may be defined based on mean of the indicator values and the standard deviation of the indicator values over a set of elements. The following is an example formula that may be used to define a rolled-up indicator based on the mean and the standard deviation of the indicator values:

$$I'(C) = \sqrt{\mu^2 + \sigma^2} e^{\rho - \rho_0} \quad \text{(Formula 5)}$$

$0 \leq \rho_0 \leq 1$ is an offset constant to control the growth of rolled-up values. When the indicator also is defined natively at the C level as I"(C), the combined indicator may be defined as:

$$I(C) = \max(I'(C), I''(C)) \quad \text{(Formula 6)}$$

Volume indicator may be used to make the definitions and concepts more concrete, although other types of indicators may also be used.

Following is an example that demonstrates another embodiment of how an indicator may be defined. Let indicator I be defined over the members of a non-empty set S. Hence I(s), for s∈S is defined. It is assumed that the indicator I is associated with non-negative values. For a given threshold of significance $I_0$, the following values are defined:

$T$ = size of $S$ $S_0 = \{s \in S \text{ such that } I(s) > I_0\}$ $T_0$ = size of $S_0$ $\rho = T_0 / T$ $\mu = \begin{cases} \text{mean of } I(s) \text{ for } s \in S_0 & \text{if } S_0 \text{ is non-empty} \\ 0 & \text{otherwise} \end{cases}$ $\sigma = \begin{cases} \text{standard deviation of } I(s) \text{ for } s \in S_0 & \text{if } S_0 \text{ is non-empty} \\ 0 & \text{otherwise} \end{cases}$ $q = \begin{cases} 1/T & \text{if } T < 4 \\ \dfrac{\log_2 T - 1}{T} & \text{otherwise} \end{cases}$ The roll-up indicator value assigned to the set S may be defined as:

$$I(S) = (\mu + 0.75\sigma) \frac{\log q}{\log \rho}$$

In this example, I(S) may be viewed as being similar to a rolled up indicator at a level C or I'(C). When the indicator is also defined natively at the rolled-up level as I"(C), then the indicator at that level may be defined as:

$$I(C) = \max(I'(C), I''(C)) \quad \text{(Formula 6)}$$

The following is an example of defining a volume indicator $I_V$ using lines of code (LOC) and Halstead length (Hl) metrics (described below). Both metrics are defined at all levels. However, only the method and class levels are associated with the natively defined indicator. Thus, at the package and codebase levels, the volume indicator $I_V$ will contain only the rolled-up indicator component from the method levels and the class levels. As an example, the following indicators may be defined:

| | |
|---|---|
| $I_{LOC}(M) = \text{LOC}/60$ | Type A indicator at the method level driven by LOC metric |
| $I_{LOC}(C) = \text{LOC}/750$ | Type A indicator at the class level driven by LOC metric |
| $I_{Hl}(M) = \text{Hl}/80$ | Type A indicator at the method level driven by Halstead length metric |
| $I_{Hl}(C) = \text{Hl}/250$ | Type A indicator at the class level driven by Halstead length metric |
| $R_M = 0.95$ | Correlation constant between lines of code and Halstead length at the method level |
| $R_C = 0.85$ | Correlation constant between lines of code and Halstead length at the class level |

Using the Formula 3 above with two type A indicators, $I_V(M) = I'_V(M)$ may be derived for every method since the methods are assumed to be the lowest level of the hierarchy. There is no roll-up component for the methods. For every simple class, i.e., those containing only methods, it is possible to roll-up the volume indicator $I'_V(C)$ for every simple class. By rolling up combinations of native indicator component and rolled-up indicator component, defining the indicator $I_V$ may be extended to all methods and classes (simple or compound) and to packages and codebases (by rolling up). Whenever necessary, recursive roll up may need to be performed.

Types of Metrics

As described above, a metric may relate to some objectively measurable or calculable characteristic. Some common metrics include lines of codes (LOC) metric which relates to determining the number of lines of codes, lines of Javadoc (LJDOC) metric which relates to determining the number of Java comment lines, and Cyclomatic complexity metric which relates how much unstructured logic exists in a module (e.g., a loop with an exiting GOTO statement).

The following are example embodiments of some metrics that may be applicable to methods and systems described herein. It may be noted that one of ordinary skill in the art may recognize that the design of the metrics may be implementation-dependent to provide various evaluation needs.

A. Rules Violation Metric

Rules Violation Metric may be defined natively at the method level. A rule set may have been selected based on some basic coding standards. Each rule may be associated with a penalty score. The penalty score may be against, for example, one of the five following quality categories:
1. Portability
2. Maintainability
3. Correctness
4. Performance
5. Testability The penalty score may be an integer having a value between 0 and 9. For example, when low penalty scores correspond to negative rating, the penalty scores such as the following may correspond to a violation:

| 1. | Portability:    | 0 |
| 2. | Maintainability: | 3 |
| 3. | Correctness:    | 6 |
| 4. | Performance:    | 0 |
| 5. | Testability:    | 2 |

The following is a code example that would produce this violation:

```
package foo;
public class C {
  public void foo( ) {
    try {
      bar ( )
    } catch (final RuntimeException e) {
    }
  }
  public void bar ( ) {
    throw new RuntimeException ( );
  }
}
```

Two possible example solutions to remove the violation from the above code may include:
1. If the try statement has no other catch clauses and no finally clause: Replace the try statement with the block statements of the block of the try statement
2. If the try statement has other catch clauses and/or a finally clause: Delete the catch clause.

It may be noted that the categories, the number of categories, and the penalty scores may be implementation-dependent and may vary from the example above.

For some example embodiments, the rule violation metric may be implemented by defining an aggregate penalty score P(V) of a violation V as an upper bound of the category penalties. The rules violation metric may be defined at the method level for a method M by adding the weighted penalty violations of each violation encountered in the method M. The weight may be inversely proportional to the inverse square of the occurrence rank. Hence, a first time that the violation V occurs in the method M, the metrics is increased by P(V), the second time by $P(V)/2^2$, and the nth occurrence by $P(V)/n^2$. The rules violation indicator is a type A indicator related to the rules violation metric and normalized by Halstead metric at the method level. The indicator may then be rolled-up to all higher levels.

B. Similar Code Blocks Metric

The similar code blocks metric is based on an equivalence relation determined using signatures. A signature is an integer associated to a module (e.g., code blocks, packages, or codebase) formed from a series of bits derived from module attributes. It may be noted that how a signature is defined is highly dependent on the application that it is designed for. Since the code blocks are at the lowest levels of a hierarchy, a signature is attached to the code blocks in order to find the code blocks that are similar. This may include code blocks that are almost identical. This has applications for improving polymorphisms leading to better maintainability and software architecture.

A signature may be represented by σ(X), where X is a code block. For some example embodiments, the signature σ(X) may be a 24 bit integer composed of twelve (12) 2-bit values of the lowest two (2) significant bits of the following indicators:
Volume
Complexity
Comment
Rules Violation
Testability
and the following metrics:
Weighted Violations
Lines of Code
Lines of Comments
Lines of Javadoc
Cyclomatic Complexity
Halstead Operands, and
Halstead Operators.

Any non-integer indicator values are multiplied by "10" and truncated prior to usage. Using the signature, an equivalence relation may be defined among a subset of code blocks in a package or the codebase P. The subset is the complement of the code blocks defined as "noise". For some example embodiments, two code blocks are related when they have the same signature. This divides the code blocks into equivalence classes. Let G1, . . . , Gn be the set of equivalence classes and |Gi| be the size of Gi. The similar code block metric for P may be defined as:

$$Sim(P) = \gamma \sum_1^n (|G_i| - 1)/N, \qquad \text{(Formula 7)}$$

where γ=100 is a scaling function, and N is the number of all code blocks in P. For example, the subset of the code blocks identified as noise and removed prior to the similar code block identification is defined using thresholds of 0.25 on risk index (described below) and 15 on Halstead length metric.

C. Entropy Metric

The entropy metric is defined based on risk index associated with the code blocks. The entropy metric may be defined natively at the package and codebase levels. The code blocks may be sorted according to their risk index. The risk index may be determined based on the values of multiple indicators including: volume, complexity, comments, rules violation and testability indicators (the testability indicator is driven by metrics such as cyclomatic complexity and number of parameters). The highest three values are averaged to define the risk index.

For some example embodiments, the top 20% of code blocks are placed into five (5) groups, where each group contains 4% of sorted code blocks. The mean values of the risk indices for each group are normalized to sum to 1 so they form a probability distribution. Let p1, . . . , p5 be the probabilities. The entropy metric may be defined as:

$$E(P) = -\sum_{k=1}^{5} p_k \log_2 p_k \quad \text{(Formula 8)}$$

where P is a package or a codebase.

D. Lines of Comments (LCOM) Metric

The practice of commenting out unused code can significantly distort the LCOM metric. The following process detects unused code resulting in a much more accurate LCOM metric. A Java program consists of tokens. Valid Java syntax has limitations on how the different kinds of tokens can be combined. By implication, only certain kinds of tokens are permitted to occur in sequence. For example, the only token that can possibly follow the keyword 'for' is an open parenthesis; the keyword 'for' followed by any other kind of token is not valid Java syntax. Determining whether the text of a comment is source code (e.g., commented-out code) can be done by tokenizing the text (as Java tokens) and analyzing successive sequences of (two or more) non-whitespace, non-comment tokens.

The more sequences of tokens that can (or cannot) occur in valid Java syntax, the greater the likelihood that the text is (or is not) source code. This mechanism requires that the comment text comprise more than one non-whitespace, non-comment token. For comment text that comprises a single token, whether the text is source code can be at least partially determined by the kind of the token and the surrounding context provided by neighboring comments. Large comments, which may comprise both description and source code, can be analyzed in sections according to valid/invalid token sequences and line boundaries.

E. Halstead Metric

The Halstead metric is defined based on a number of operators and number of operands in the code blocks. For a given module or code block, the following four scalar values may be derived:

$n_1$=the number of distinct operators
$n_2$=the number of distinct operands
$N_1$=the total number of operators
$N_2$=the total number of operands From the above values, five different measurements may be derived as follows:

| Measurement | Symbol | Formula |
| --- | --- | --- |
| Program length | N | $N = N_1 + N_2$ |
| Program vocabulary | N | $n = n_1 + n_2$ |
| Volume | V | $V = N \log_2 n$ |
| Difficulty | D | $D = \left(\frac{n_1}{2} \times \frac{N_2}{n_2}\right)$ |
| Effort | E | $E = D \times V$ |

The above values may also be used to determine Halstead total operands metric and Halstead total operators metric by counting data accesses and operations on one or more data, respectively. Halstead length metric may be defined as the sum of the Halstead total operands metric and the Halstead total operators metric.

F. Volatility Metric (VM)

It is assumed that every file is associated with date information. The date information may be from a source control tool. The date information indicates the dates when the file was touched. For example, touching may include viewing, editing, copying, or the like. The source control tool may also have information about the different individuals or users who touch or access the file. For some example embodiments, the VM is assigned a penalty with every touch with increasing values as a function of time. This metric may assign a penalty if the files are touched frequently close to a release date as the frequent touching may correspond to the files having problems.

The following is an example that demonstrates one embodiment of how a volatility metric may be defined. Let $d_1$, $d_2$, ..., $d_n$ be the dates associated with the file F. Let D be a latest date (or most recent date) of all the dates captured in the codebase. In other words, D is the latest date of record. The volatility metric VM(F) may be defined as:

$$VM1(F) = \sum_{i=1}^{n} \frac{d_i - d_1}{D^* - d_i} \quad \text{(Formula 9)}$$

where $D^*=D+D_0$ days. The default offset value of $D_0$ in the definition of $D^*$ is subjected to adjustment by users.

G. Quality Distribution Metric (DST)

Let T be a tree associated with the hierarchy of a (root) module X in a codebase. For example the module can be a class, a package, or a codebase. Every node of the tree T may correspond to a sub-module of the root module X. A quality value such as a risk value may be attached to every node of the tree T. Other quality value such as indicators, indices or metrics with reference to the hierarchical structure may also be attached and used. The DST metric may enable quantifying the local distribution of the given indicator over the module. For example, the DST metric may be used in the enhancement of an architectural integrity indicator which is driven by similar codeblocks, entropy metric and other metrics as described below. In order to define the DST metric, the center of the module X may be defined with respect to the indicator I.

For every node $x \in T$, the "moment" of T with respect to the indicator I and the node x may be defined as:

$$M(x, I) = \sum_{y \in T} d(y, x) I(y), \quad \text{(Formula 10)}$$

where d is the distance between y and x measured by the number of edges in a shortest path between y and x, and I(y) is the indicator at node y. Define the center of T with respect to I to be the node with minimum moment M(x, I) (if there are multiple centers, a random one is used). The distribution metric of X with respect to indicator I to be the moment of the center of T with respect to I may be defined as:

$$DST(X, I) = \min_{x \in T} M(x, I) \quad \text{(Formula 11)}$$

For example, the DST metric may be used to identify whether known risks associated with a codebase can be grouped to reduce the risks on the entire codebase. This may potentially result in good architectural integrity indicator. If the risks were disbursed throughout the codebase, that may potentially result in bad architectural integrity indicator.

Types of Indicator

As described above, an indicator may be used to provide quality measurement regarding a particular method, class, package, or codebase. An indicator may be based on one or more metrics and one or more normalized metrics.

The following are example embodiments of some indicators that may be applicable to methods and systems described herein. It may be noted that one of ordinary skill in the art may recognize that the design of the indicators may be implementation-dependent to provide various measurement needs.

A. Complexity Indicator

A complexity indicator may be defined natively only at the method level. Because it is only defined at the method level, the values at the class and the package levels have only rolled-up components. For some example embodiments, the complexity indicator $I_C$ may be defined using the following process:

1. Let M be a method (more general code block).
2. Define $I_C(M)$ as a type A indicator driven by the cyclomatic complexity metric, as follows:

$$I_C(M) = CYC(M)/11 \quad \text{(Formula 12)}$$

3. Define $I_C$ at the class, package, and codebase levels by the roll-up process.

B. Code coverage Indicator

A code coverage indicator may be natively defined at the method level. The code coverage indicator may provide a fraction or ratio of lines or branches covered by a module (e.g., code block) being evaluated. A line coverage indicator $I_{Lcvy}$ (described below) may be defined as a type A indicator driven by line coverage metric. A line coverage metric is a ratio of the lines of code of a module by total lines of code. A branch coverage indicator $I_{Bcvy}$ may be defined as a Type A indicator driven by a branch coverage metric. The coverage indicator $I_{Lcvy}$ may then be defined as a Type B indicator using the line and branch coverage indicators. Line coverage indicators and branch coverage indicators are similar, and for convenience and brevity, only line coverage indicators are described herein.

Initially, the fraction of lines covered is mapped to a "penalty" function more in agreement with software development standards. For example, coverage of less than 20% may result in a high penalty, and coverage of above 80% may result in a low penalty or no penalty. For coverage that is in between 20% and 80%, the penalty may be computed using a function specific for a codebase. The function may be non-linear. For example, the mapping between 20% coverage and 80% coverage may approximate a logarithmic curve. Subsequent to the mapping, the metric may be normalized. It may be noted that, for this particular line coverage metric, high values may correspond to good values, the coverage indicator may be defined so that high values may correspond to bad values.

The indicator at the method level where the penalty metric is natively defined is then defined by normalizing the penalty function to a complexity metric such as cyclomatic complexity. The indicator is then extended to all levels by the roll-up process. The following is an example embodiment of a process that may be used to determine the line coverage indicator. Let $0 \leq x \leq 1$ be the fraction of lines covered by tests in a method. A penalty function $f$ may be defined as:

$$f(x) = \begin{cases} A & x \leq x_1 \\ Ce^{\frac{x}{a}} - B & x_1 < x < x_2 \\ D & x_2 \leq x \end{cases}$$

where, $x_1 = 0.2$ $x_2 = 0.8$

-continued $A = 5.0$ $$B = \frac{Ae - \frac{x_2}{a} - De - \frac{x_1}{a}}{e - \frac{x_1}{a} - e - \frac{x_2}{a}}$$

$$C = \frac{A - D}{e - \frac{x_1}{a} - e - \frac{x_2}{a}}$$

$D = 0.0$ $A = 0.1$

The line coverage indicator $I_{Lcvg}$ is then defined as, $$I_{Lcvg}(102_3) = f(x)/CYC \quad \text{(Formula 13)}$$

where CYC is the Cyclomatic complexity.

For some example embodiments, the line coverage indicator may be defined be converting the ratio of lines covered into a coverage metric. A coverage software may be used to determine the ratio of lines covered. The conversion may be performed using a non-linear look-up table which represents more closely the value of coverage. This also inverts the values so that large values may correspond to bad values. The following is an example look-up table:

TABLE 2

| Line Coverage ratio r | $M_{line\ coverage}$ |
|---|---|
| $0.0 \leq r < 0.05$ | 1.0 |
| $0.05 \leq r < 0.10$ | 1.0 |
| $0.10 \leq r < 0.15$ | 0.99 |
| $0.15 \leq r < 0.20$ | 0.97 |
| $0.20 \leq r < 0.25$ | 0.95 |
| $0.25 \leq r < 0.30$ | 0.92 |
| $0.30 \leq r < 0.35$ | 0.90 |
| $0.35 \leq r < 0.40$ | 0.88 |
| $0.40 \leq r < 0.45$ | 0.85 |
| $0.45 \leq r < 0.50$ | 0.70 |
| $0.50 \leq r < 0.55$ | 0.60 |
| $0.55 \leq r < 0.60$ | 0.50 |
| $0.60 \leq r < 0.65$ | 0.40 |
| $0.65 \leq r < 0.70$ | 0.30 |
| $0.70 \leq r < 0.75$ | 0.10 |
| $0.75 \leq r < 0.80$ | 0.05 |
| $0.80 \leq r < 0.85$ | 0.001 |
| $0.85 \leq r < 0.90$ | 0.0 |
| $0.90 \leq r < 0.95$ | 0.0 |
| $0.95 \leq r \leq 1.00$ | 0.0 |

The line coverage indicator may then be defined as:

$$I_{coverage} = 2I_{complexity} \cdot \log_2(I_{complexity} \cdot M_{line\ coverage}) \quad \text{(Formula 14)}$$

C. Volatility Indicator

The volatility indicator is defined using the physical hierarchy of file level, package, and codebase. The information needed to define the volatility indicator is more naturally associated with files, etc. The volatility indicator, hence, is not defined for methods or classes. Because the volatility indicator is defined at the file level, they may be rolled up to the package and the codebase levels. The volatility indicator may be defined as a Type A indicator using a single metric. The volatility indicator may be defined based on the volatility metric (described above).

D. Architectural Integrity Indicator

The architectural integrity indicator may be defined natively at the package and codebase levels. This indicator is based on similar code blocks metric and entropy metric.

Additionally when "References" (dependencies) are available, two other metrics may also be used. These two metrics are Coupling between Object Classes (CBO) and Lack of Cohesion in Methods 2 (LOCOM2) metrics. The architectural integrity indicator without references may be defined as:

$$I_{Arch\ Integ} = \frac{1}{\gamma}(0.1 M_{Entropy} + 0.1 M_{Similar}),\qquad\text{(Formula 15)}$$

where $\gamma$ is a scale factor currently set to 0.43.

When the references are available—hence the metrics $M_{CBO}$ and $M_{LOCOM2}$ are available—they are rolled up from Class level to Package and Codebase and the definition is modified to:

$$I_{Arch\ Integ} = \frac{1}{\gamma}(0.05 M_{Entropy} + 0.05 M_{Similar}) + \qquad\text{(Formula 16)}$$
$$0.00125 M_{CBO} + 0.15 M_{LOCOM2})$$

Concentration Analysis

Consider a list of numerical attributes associated to a population. Examples from the field of Economics such as household annual income of a population are abundant. Different attributes associated to the methods in a codebase, such as lines of code (LOC), is an example, but many numerical attributes may be associated with the population which may be similar to methods, classes, or packages.

In general, concentration analysis evaluates or analyzes such a list when it is sorted and segmented into a small number of groups. Using the example from the field of Economics, suppose the population is sorted according to income and segmented into 1% percentile. The array of size 100 generated as a result is the subject of concentration analysis. Merely as an example, the situation of a single numerical attribute is examined (even though there may be multi-dimensional attributes situations).

For example, let L be a population sorted according to an attribute. For a fixed n divide the sorted population into n equal segments and let $a_k$ be the average of values of the kth segment. The array $(a_1, \ldots, a_n)$ is referred to as the n-concentration average. When n is fixed, the average may be referred to simply as the concentration average and tacitly assume the value n. Let $p_k = a_k/T$, where $$T = \sum_1^n a_k \qquad\text{(Formula 17)}$$

The array $(p_1, \ldots, p_n)$ is referred to as the n-concentration ratio (concentration ratio when the value n is assumed). Since $\Sigma_1^n p_k = 1$, the values of $p_k$ can be treated as a (decreasing) discrete density function which allows using concepts from probability theory.

Let L be the list of methods in a codebase and the attribute under consideration be Risk. For n=100, all the methods can be divided into 100 segments; then the percentile averages and ratios can be considered. This example can be generalized to any attribute and any fixed n. Moreover, the methods can be generalized to classes, files, etc.

Concentration Based Metrics

Based on the choice of list L and value n, the concentration average and hence the concentration ratio can be defined with different properties. For any choice, the value of $p_1$ and $a_1$, the first concentration ratio, and the first average ratio are of primary importance and form two metrics used in indicators such as the architectural integrity indicator.

First Concentration Metrics

The values $p_1$ and $a_1$ are referred to as the first concentration metrics. To incorporate them into indicators, first they may need to be normalized. The concentration ratio $p_1$ is naturally normalized, but the value $a_1$ needs to be normalized appropriately in the process of indicator definition.

Shannon Entropy

Another useful concept that can be applied to the concentration ratio p is Shannon entropy. Shannon entropy which was first defined in the context of information theory is a measure of deviation from uniformity. In that sense, large entropy applied to concentration ratio is in general a sign of low quality in particular with respect to architectural integrity indicators.

Kullback-Leibler Divergence

Another application of information theory to software quality evaluation is to use the Kullback-Leibler divergence as a means comparing two codebases and a codebase with a theoretical ideal one. The Kullback-Leibler divergence for two probability density functions p and q may be defined as:

$$D_{KL}(p \parallel q) = \sum_k p_i \log_2 \frac{p_i}{q_i} \qquad\text{(Formula 18)}$$

Kullback-Leibler Relative Metric

Let p be a fixed density function representing an ideal concentration ratio. Define the Kullback-Leibler relative (top) metric as:

$$D_{KL}(p\|q). \qquad\text{(Formula 19)}$$

Evaluation Examples

FIGS. 3-9 include diagrams that illustrate examples of evaluation information displayed by an evaluation system, in accordance with some example embodiments. Using the above described metrics, indicators and indices may be defined. The evaluation system may include display interface 300 which may the display information related to a codebase (identified herein as Apache Ant 1.7.0). While information about only one codebase is shown, the display interface 300 may display information related to multiple codebases. This is dependent on the number of codebases being evaluated.

The display interface 300 may display multiple fields 302 relating to indices. In the presently shown example, the fields 302 are associated with two indices. Indices 208 include Risk $302_R$. Risk is a quality index and is an assessment of drivers that cause source code to create unexpected or incorrect behavior of an application or project from the end user's perspective. Drivers of the risk index include a volume indicator, a complexity indictor, a comment indicator, a rules violation indicator, and a testability indicator. Indices 208 also include Un-maintainability $302_M$. Un-maintainability is an index representing the inability to modify a software system to change or add capabilities, improve performance, or correct defects without introducing new defects. Un-maintainability may be driven by many indicators and metrics, but currently driven by volume, complexity, and comment indicator.

The display interface 300 also provides indicators 206 for codebase 112. Indicators 206 in this case include volume $304_V$. Volume is an indicator driven by metrics such as LOC, Halstead length, or the like. Another indicator is complexity $304_C$. Complexity is an indicator driven by metrics related to code complexity, such as, for example, cyclomatic complexity. Complexity may drive indices, such as, for example, un-maintainability described above. Another indicator is comments $304_{COM}$. Comments may be driven by metrics such as in-line comments, lines of Javadoc, or the like. Another indicator is rules violation $304_{RV}$. The rules violation field is driven by metrics as defined above.

Another indicator is architectural integrity $304_{AI}$. Architectural integrity is driven by similar codeblocks and entropy metric and other metrics as described above. It may also be driven by metrics such as copy and paste instances. Another indicator is testability $304_T$. Testability is driven by metrics such as cyclomatic complexity and number of parameters. Another indicator is code coverage $304_{CC}$. Code coverage $304_{CC}$ is driven by metrics such as line coverage and complexity as described above.

As explained above, indices and indicators are designed such that higher values generally provide indication of worsening values. Thus, code coverage $304_{CC}$ of 0.54 shows the codebase 112 has a relatively good code coverage. Rules violation indicator $304_{RV}$ of over 5.55, however, shows a poor evaluation relating to rules violation of the code base. While providing the standard high value bad display is beneficial for a user, each index or indicator may have its own thresholds of badness (e.g., red, yellow and green thresholds), as indicated by the legend 306. For ease of display and reference, it is possible to provide a legend 306 which may provide a visual indicator for each field, such that, a good indicator or index may be color coded, for example, green, a bad indicator or index may be color coded, for example, red, and an average indicator or index may be color coded yellow. Numerous other visual cues are possible and limited only by the choice of the designer and/or customer. As shown in display interface 300, legend 306 provides thresholds for when each indicator or index changes from one visual cue to the next. Volume indicator $304_V$ includes a sort arrow 308. Sort arrow allows the particular index or indicator or metric to be sorted as desired. While only shown and described for volume indicator $304_V$, the sort feature could be provided on any portion of the display.

While useful to identify codebases or codebases with at least one or more portions that are considered to be of low quality, display interface 300 is of limited value as the end user cannot easily identify the poor performing portions of the code from display interface 300. Thus, display interface 300 provides a drilldown icon 310 for each displayed codebase 112.

Figure 4:
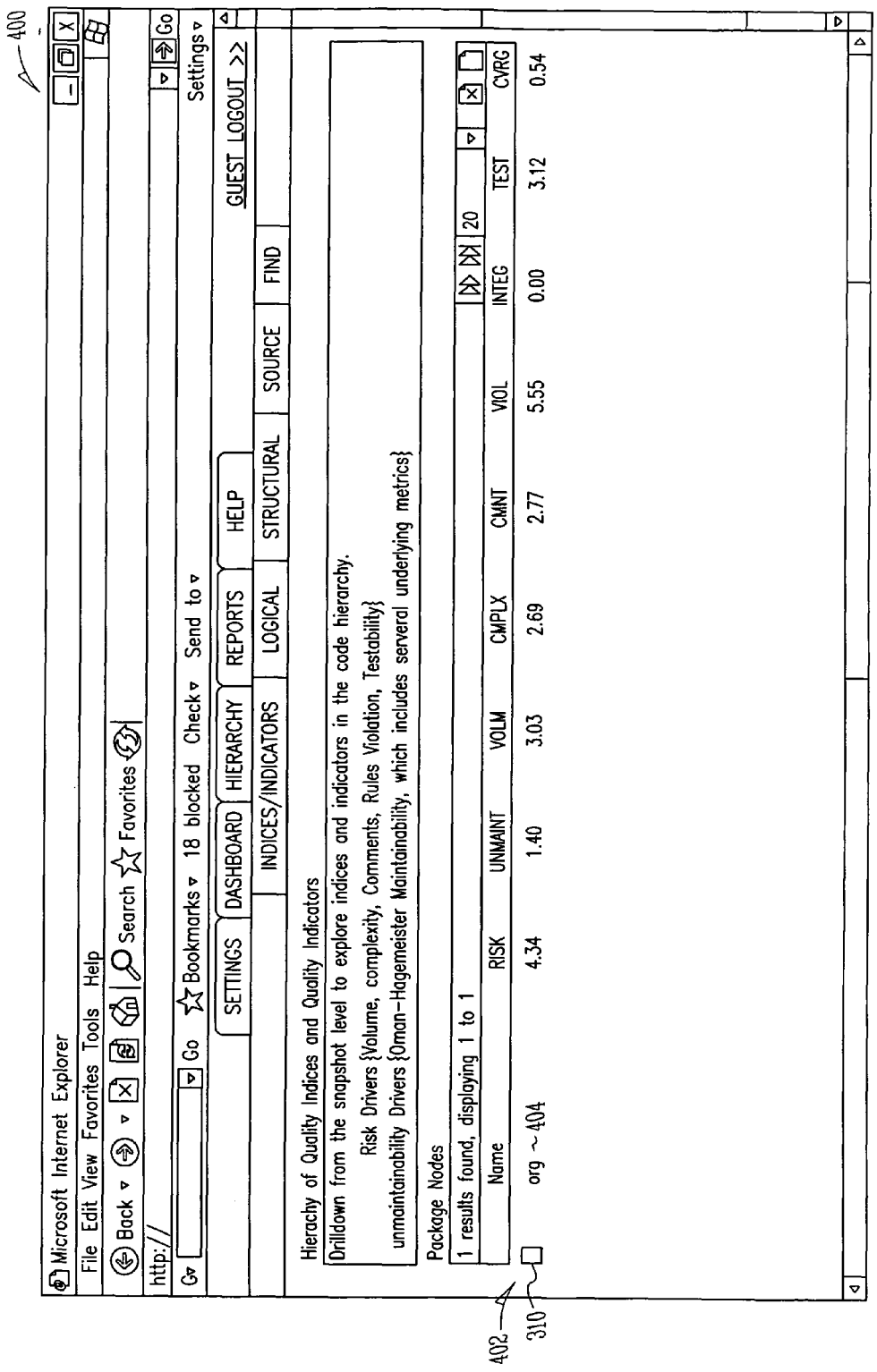

FIG. 4 shows a display interface 400 containing the first package layer 402 for codebase 112. As shown in FIG. 4, the first package layer 402 comprises a single package 404 for codebase 112. Package 404 is identified by the name Org in this example. As the single level shows the indices 208 and indicators 206 are rolled up to the codebase display interface 300. The display interface 400 contains a drill down icon 310 as well.

Figure 5:
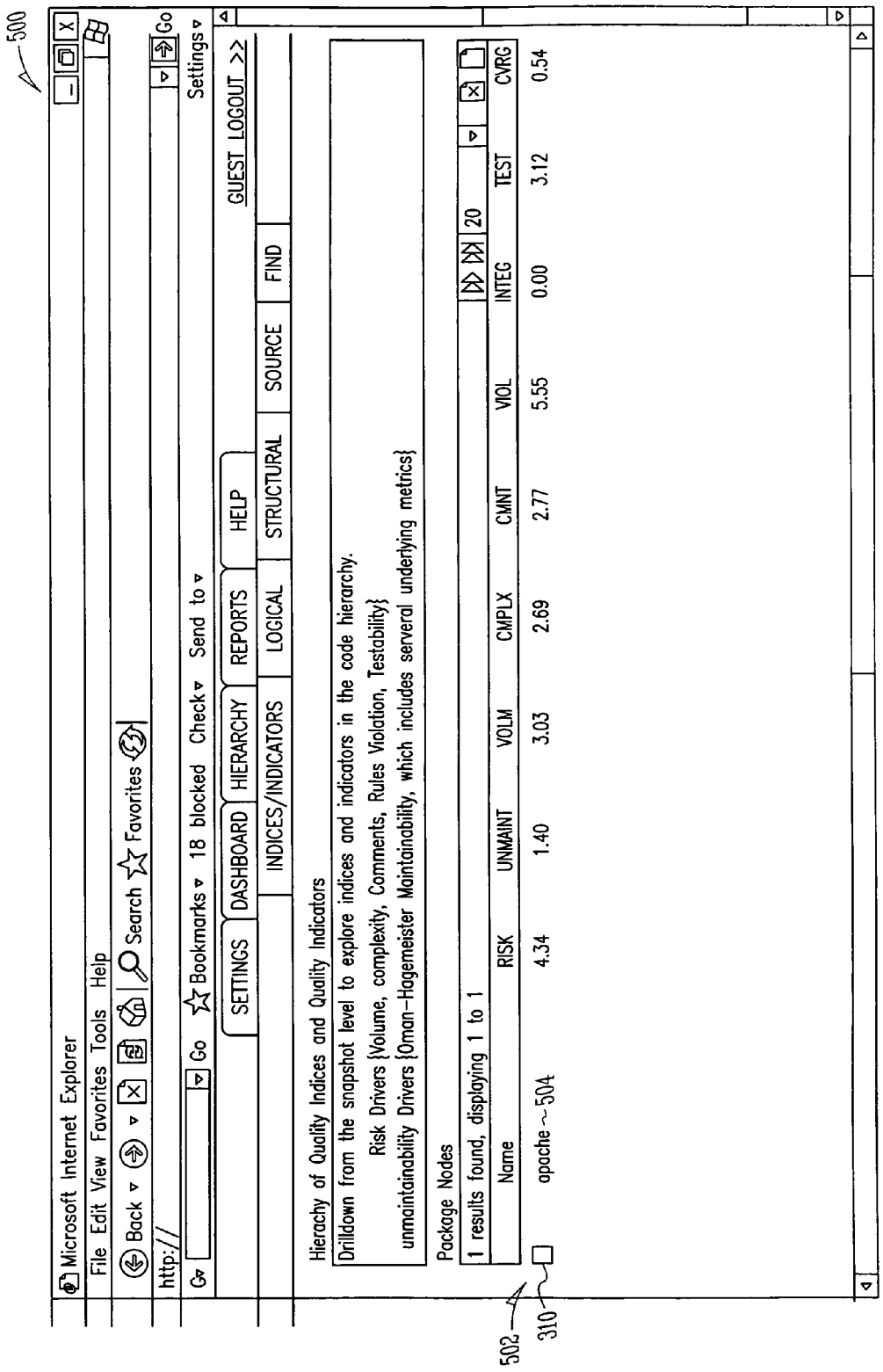
Figure 6:
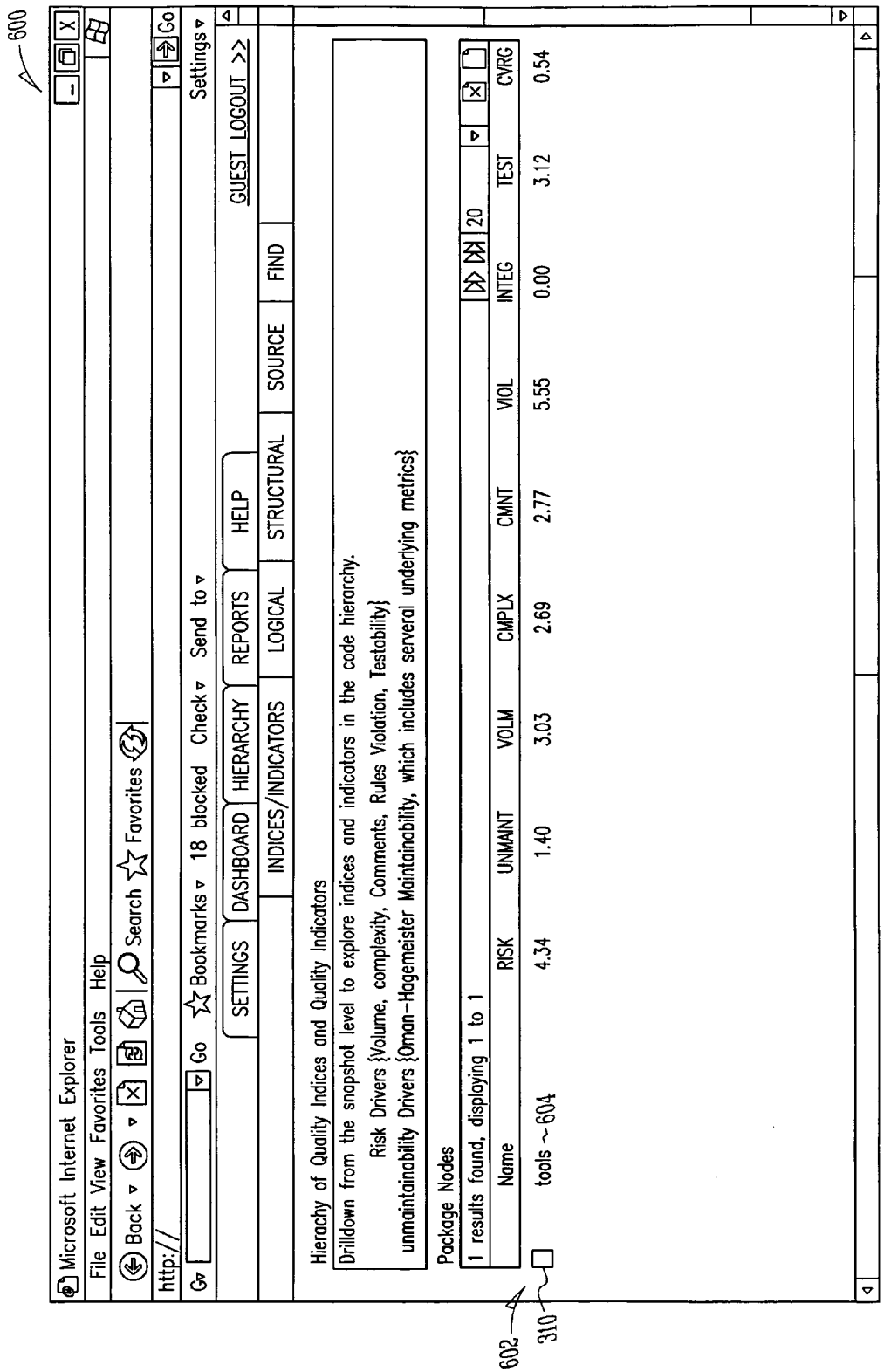

Drilling further down in codebase 112 is shown in display interface 500 of FIG. 5, which is the second package layer 502 comprising a single package 504 under first package layer 402. Again, the indices and indicators from the second package layer 502 were rolled up to first package layer 402. As shown in the display interface 600 of FIG. 6, drilling further down using the drill down icon 310 provides a third package layer 602 comprising a single package 604 under the second package layer 502.

Figure 7:
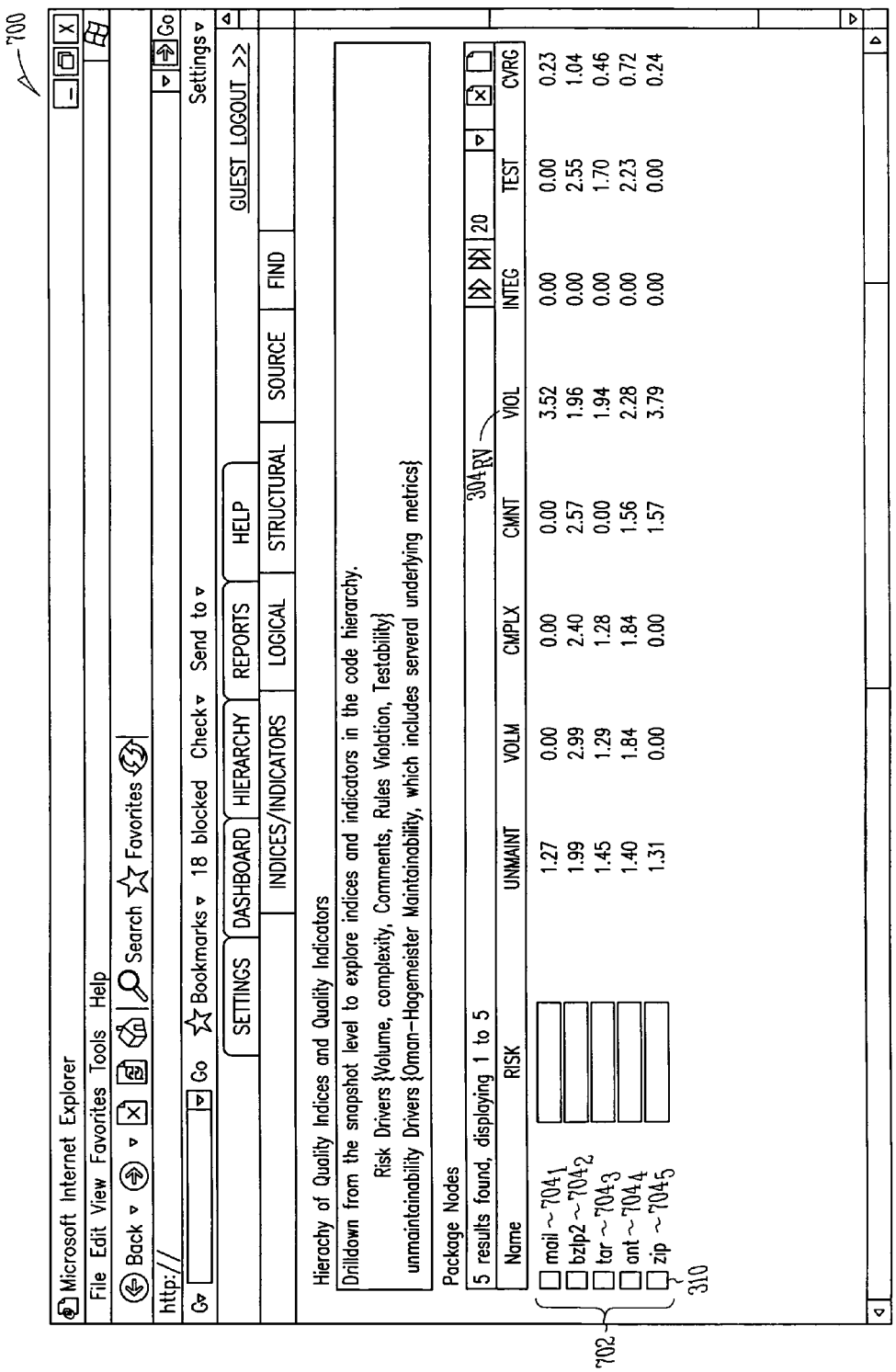

Using the drill down icon 310 provides display 700 shown in display interface 700 of FIG. 7. Display interface 700 includes a fourth package layer 702 comprising packages $704_{1-5}$. Packages $704_{1-5}$ includes, respectively a mail package, a bzip2 package, a tar package, an ant package, and a zip package. As can be seen from indices 208 and indicators 206, the indices and indicators at a fourth package layer 702 are different than previous package layers or a codebase layer and comprise a combination of indicators providing better or worse indication. As explained above, the worse indication is propagated through the evaluation tool to ensure the administrator can identify issues at the highest level and flow down to the point where the problem exists.

As shown in FIGS. 3-7, rules violation indicator $304_{RV}$ indicates a red or poor performance. Rules violation indicator $304_{RV}$ for packages $704_{1-5}$ shows none of the packages individually exceed the threshold quality indicator (although none are shown to provide relatively good performance using the presently provided indicator). Thus, the system administrator can readily determine that the problem branches into multiple directions at this point with the two major violators being packages $704_1$ and $704_5$, for example. In this case, package 704 is selected to drill further down into the structure 100 to determine whether the quality can be further traced.

As shown in display interface 800 of FIG. 8, under fourth package layer 702, resides the first class layer 802 having eleven classes $804_{1-11}$ comprising in this example AsiExtraField, ExtraFieldUtils, JarMarker, UnixStat, UnrecognizedExtraField, ZipEntry, ZipExtraField, ZipFile, ZipLong, ZipOutputStream, and ZipShort. Looking at rules violation field $304_{RV}$ it can be readily determined that the poor performing component of package $704_5$ resides largely in class $804_6$ by referring to its associated rules violation indicator $304_{RV6}$.

Figure 9:
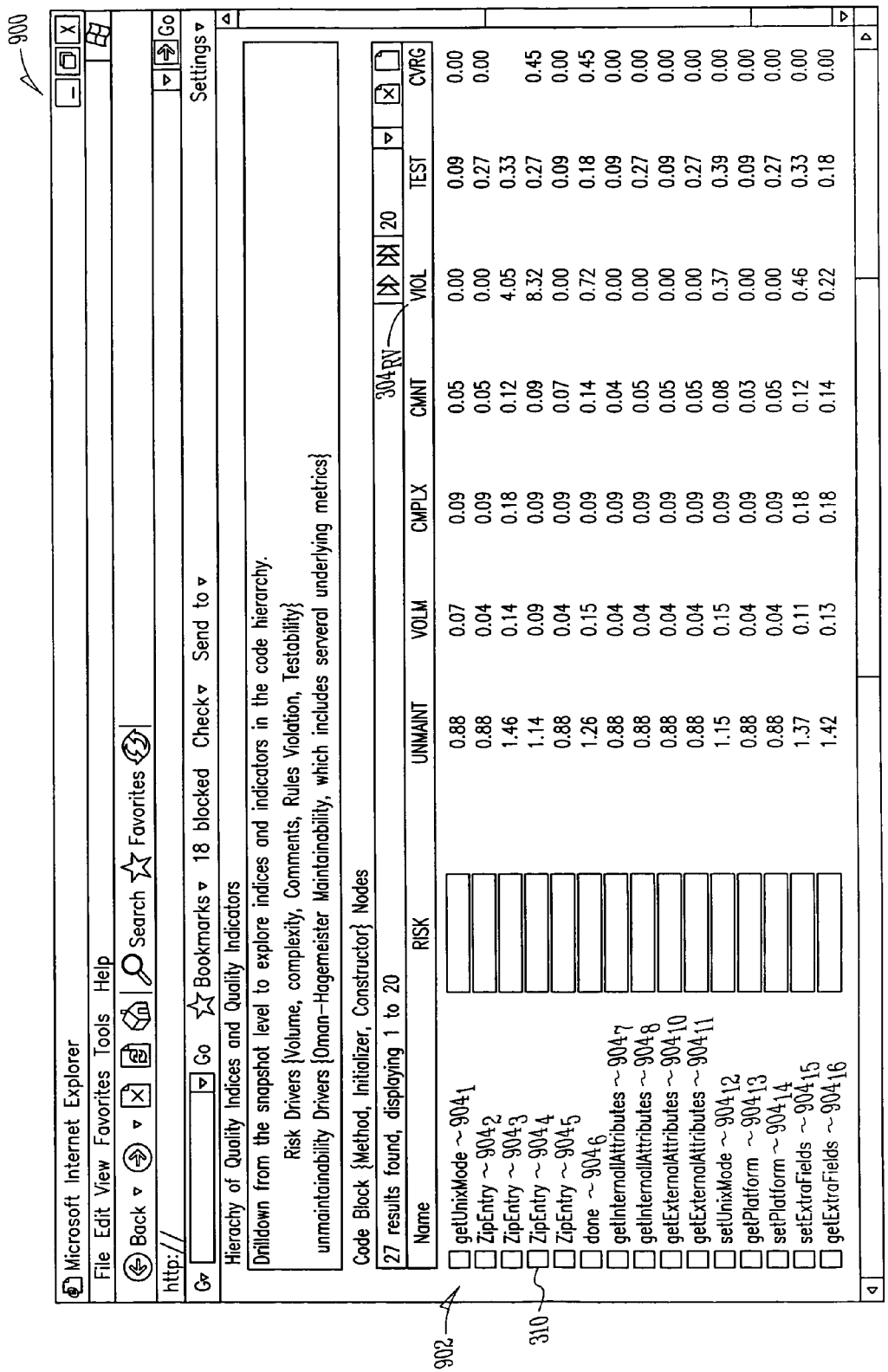

As shown in the display interface 900 of FIG. 9, selecting the drill down icon 310 associated with class $804_6$ provides a first method layer 902 under the first class layer 802. Similar to package layers, there could have been numerous class layers, however, in this example and for brevity, class layer 802 results in method layer 902 as shown in part by the display interface 900 in FIG. 9. Method layer 902 comprises as shown 27 methods of which methods $904_{1-16}$ are shown. Looking to rule violation indicator 304, it is seen that method $904_4$ and method $904_3$ have the largest rules violation, which likely caused the high violation indication in class $804_6$ and so on up the chain which ultimately provided a poor performance indication in the rules violation indicator 304 associated with codebase 112 in FIG. 3.

It may be noted that although the examples illustrated in FIGS. 3-9 refer to using a display and/or displaying evaluation information to an end user, embodiments of the invention may also enable presenting the evaluation information via other techniques other than via a display. For example, the evaluation information may be communicated to a program via an application programming interface (API).

Flow Diagram

Figure 10:
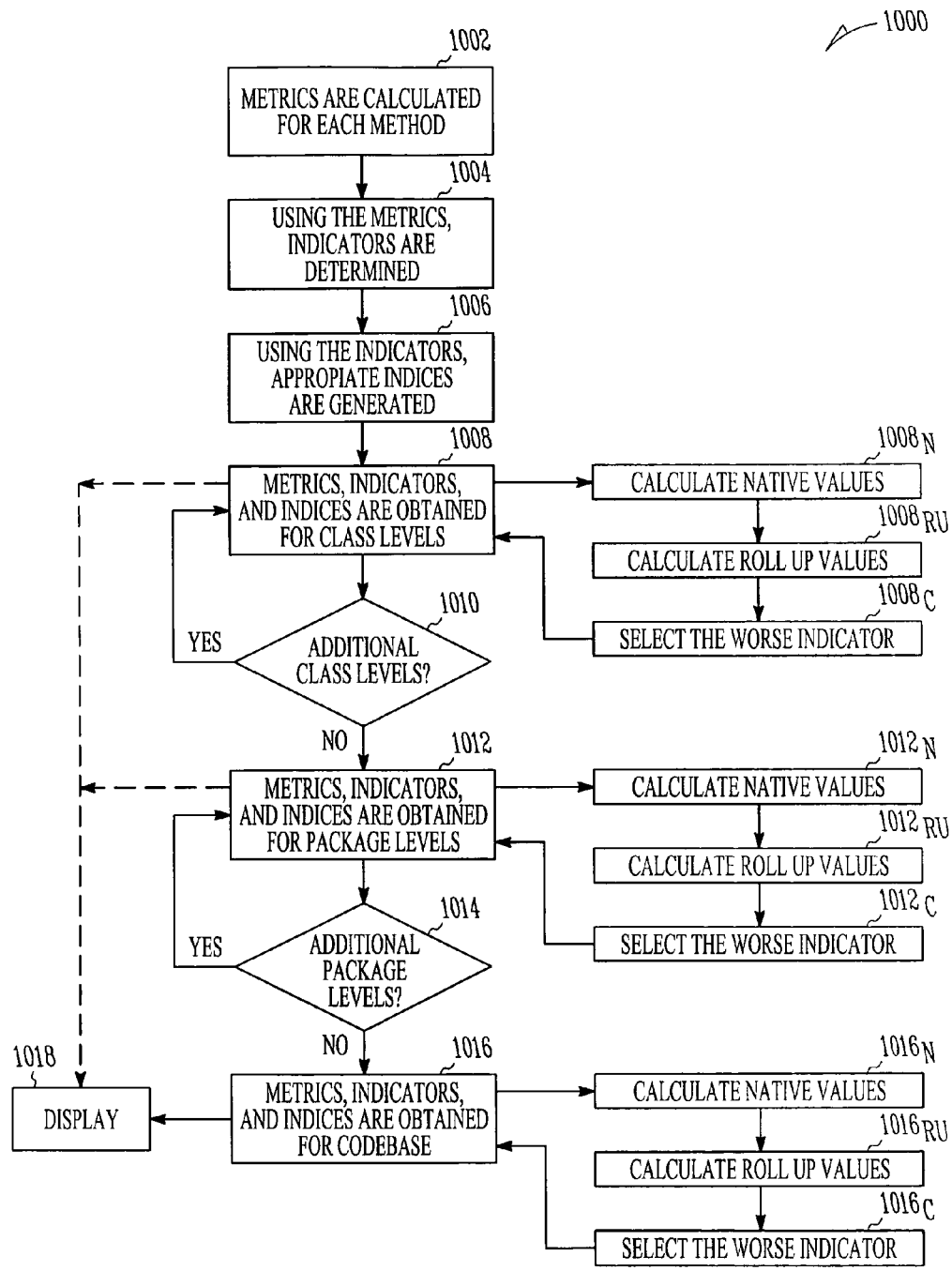
FIG. 10 is a flow diagram that illustrates an example method, in accordance with some example embodiments, of evaluating a codebase.

FIG. 10 is a flow diagram that illustrates an example process of evaluating a codebase, in accordance with some example embodiments. The process may start at block 1002 where metrics are calculated for each method associated with a codebase. It may be noted that a metric may be natively defined at any level (e.g., class, package, codebase) or at multiple levels. At block 1004, indicators may be determined. Note that the indicators may be broadly constructed or defined using normalized metrics. Using the indicators, appropriate indices are generated for the level, as shown in block 1006. Once the metrics, indicators, and indices are derived for the level, the indicators are obtained for the successive level, as shown in block 1008.

Obtaining the indicators for the next hierarchy level may include calculating native 1008*n* and roll up 1008*ru* values for the indicators at the first hierarchy level, as shown in block 1008*c*. At block 1010, it is determined whether additional class levels exist. If additional class levels exist, the process may return to block 1008. If additional class levels do not exist, metrics, indicators, and indices for successive package layers are obtained, as shown in block 1012.

Obtaining metrics, indicators, and indices for the package level may include calculating native 1012*n* and roll up 1012*ru* values for indicators and indices at the package level and selecting the worse indicator as the metric, indicator, or index for the package, as shown in block 1012*c*. At block 1014, it is determined whether additional package levels exist. If additional package levels exist, the process may return to block 1012. If additional package levels do not exist, metrics, indicators, and indices for the codebase are obtained, as shown in block 1016.

Obtaining metrics, indicators, and indices for the codebase includes calculating native 1016*n* and roll up 1016*ru* values for indicators and indices at the codebase and selecting the worse indicator as the metric, indicator, or index for the codebase, as shown in block 1016*c*. Each metric, indicator, or index for each of the one or more methods, classes, packages, and codebase may be displayed, as shown in block 1018. The dotted lines that connect blocks 1008 and 1012 to the block 1018 are used to illustrate that the information calculated from blocks 1008 and 1012 may also be displayed.

Figure 11:
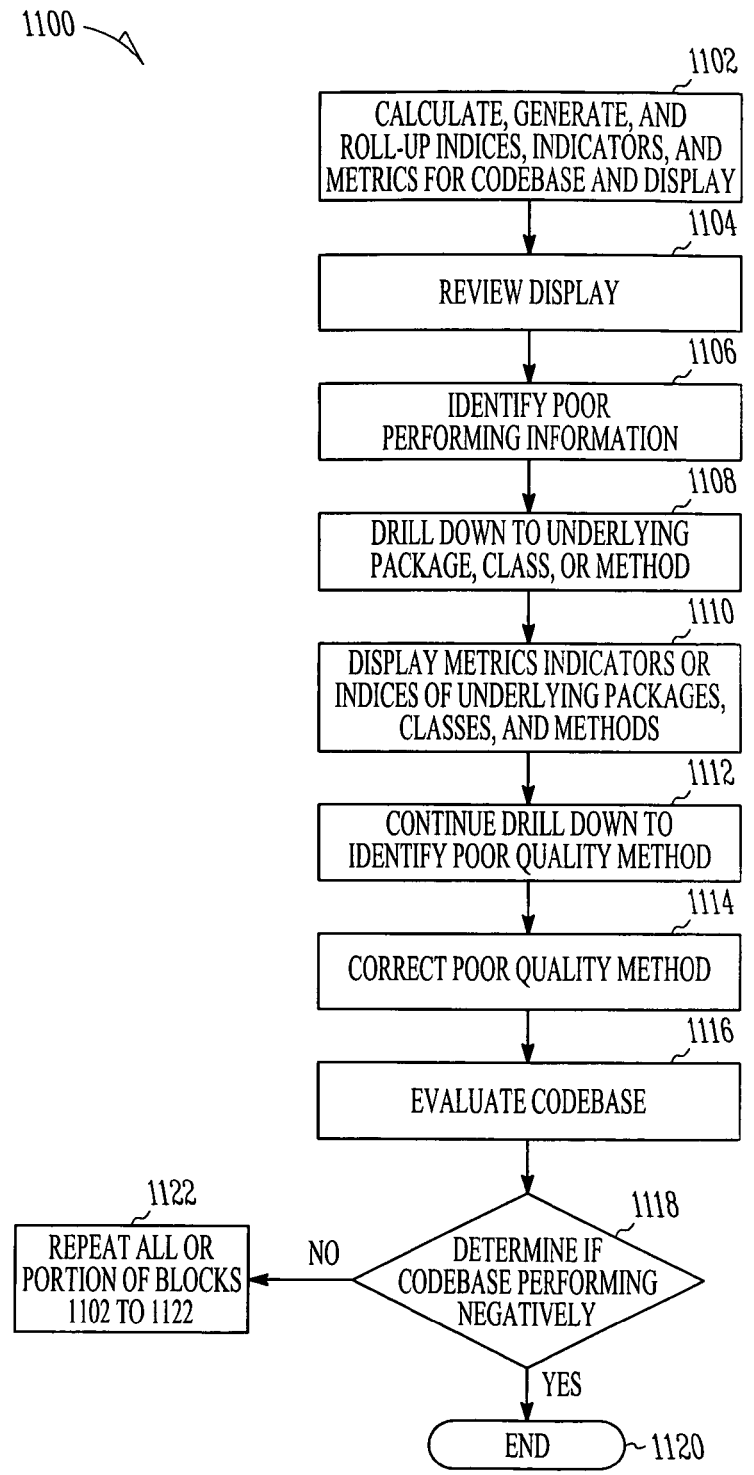
FIG. 11 is flow diagram that illustrates an example method, in accordance with some example embodiments, of an alternative approach of evaluating a codebase.

FIG. 11 is a flow diagram that illustrates an example process of drilling down to identify a code block that can be improved, in accordance with some example embodiments. First, metrics, indicators, and indices are calculated, generated and rolled-up through codebase 112 and displayed in a display interface 300, as shown in block 1102. An end user reviews the display (block 1104), and identifies poorer performing information, as shown in block 1106. The user drills down to the underlying package, class and method layers (block 1108), and causes the associated metrics, indicators, and indices of the underlying package, class and method layers to be displayed in a display, as shown in block 1110.

The end user may continue to drill down into until the poor performing method is discovered, as shown in block 1112. At which time appropriate resources may be directed to the poor performing method to improve its quality, as shown in block 1114. Once the quality of the identified code is improved or corrected, the codebase is evaluated (block 1116), and it is determined whether the codebase is performing adequately, as shown in block 1118. If the codebase is performing adequately, the process may end, as shown in block 1120. If it is determined that the codebase is not performing adequately, the process, or a portion thereof, may be repeated, as shown in block 1122.

Figure 12:
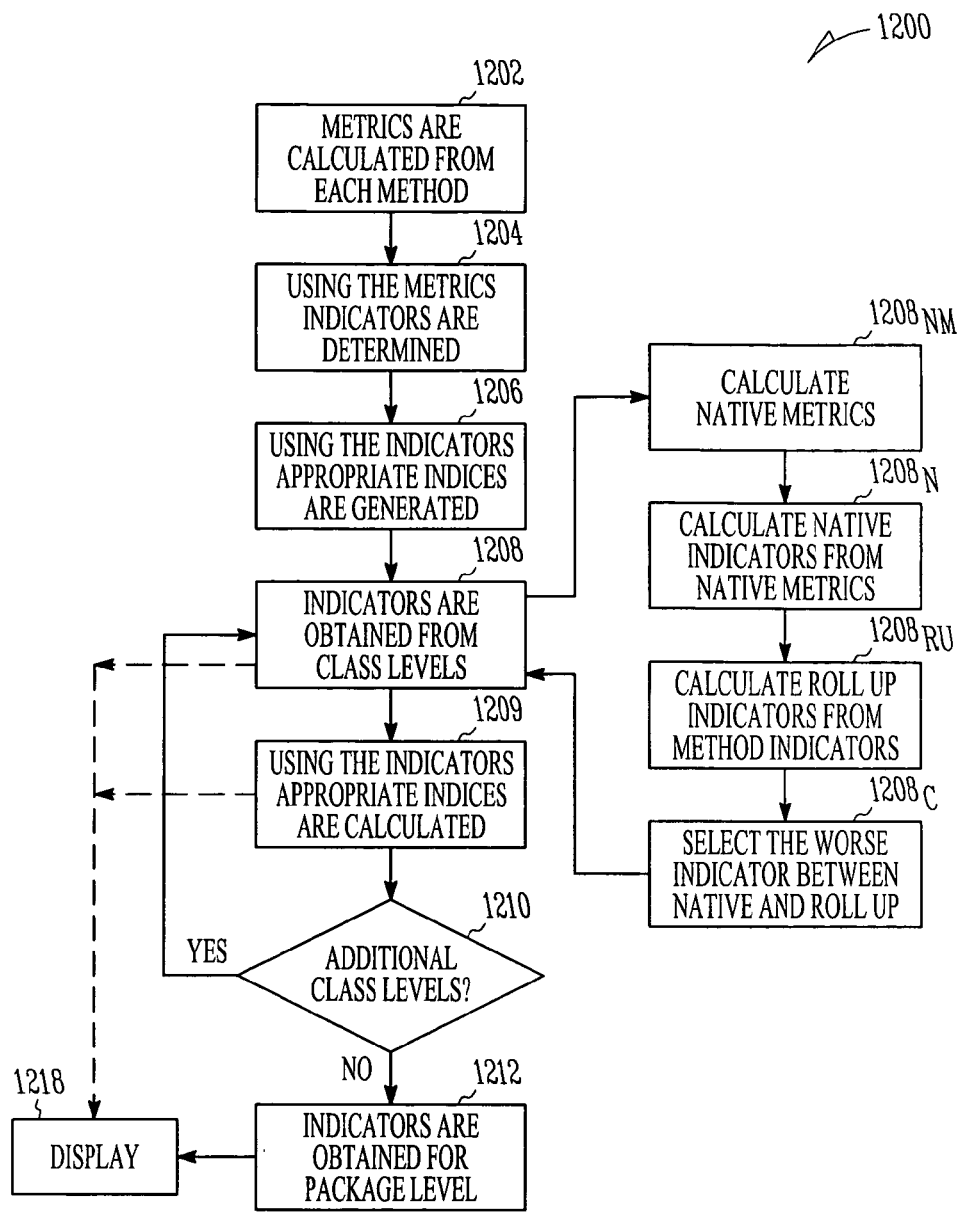
FIG. 12 is flow diagram that illustrates an example method, in accordance with some example embodiments, of an alternative approach of evaluating a codebase.

FIG. 12 is flow diagram that illustrates an example process of an alternative approach of evaluating a codebase, in accordance with some example embodiments. The flow diagram in FIG. 12 is slightly similar to the flow diagram of FIG. 10. The process may start at block 1202 where metrics are calculated for each method associated with a codebase. Using the metrics, indicators are determined for the methods, as shown in block 1204. It may be noted that indicators should be broadly constructed to include normalized metrics. Using the indicators, appropriate indices are generated for the method level, as shown in block 1206. Once the metrics, indicators, and indices are derived for the method layer, natively defined class level metrics are calculated for each class, as shown in block 1208*nm*. Using natively defined metrics, natively defined indicators are determined for the classes. Obtaining indicators for the class level includes calculating native 1208*n* and roll up 1208*ru* values for indicators at the first class level and selecting the worse indicator, as the indicator for the class, as shown in block 1208*c*. The indices for a class are computed after all indicators are computed for the class, as shown in block 1209. Although not shown, it may be noted that, similar to FIG. 10, the process described in blocks 1208*nm* to 1208*c* may also be applied with determining metrics and indicators for the package level and for the codebase level.

At block 1210, it is determined whether additional class levels exist. If additional class levels exist, control returns to step 1208 when roll up is from first class level to the next successive one. If additional class levels do not exist, the process continues to block 1212 where natively defined metrics and indicators for the package level are obtained. Obtaining indicators for the package level includes calculating native and roll up values for indicators at the package level and selecting the worse indicator as the indicator for the package. The indices for a package are then computed after all indicators are computed for the package.

Although not shown, the process may then continue with determining whether additional package levels exist. If additional package levels exist, the process may return to block 1212. If additional package levels do not exist, natively defined metrics and indicators for the codebase are obtained. Obtaining indicators for the codebase includes calculating native and roll up values for indicators and indices at the codebase and selecting the worse indicator as the indicator for the codebase. The indices for a codebase are computed after all indicators are computed for the codebase. Each metric, indicator, or index for each of the one or more methods, classes, packages, and codebase may be displayed in block 1218. The dotted lines illustrated in FIG. 12 indicate that information generated from the connected blocks may be displayed in block 1218.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic, Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs miming on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 13:
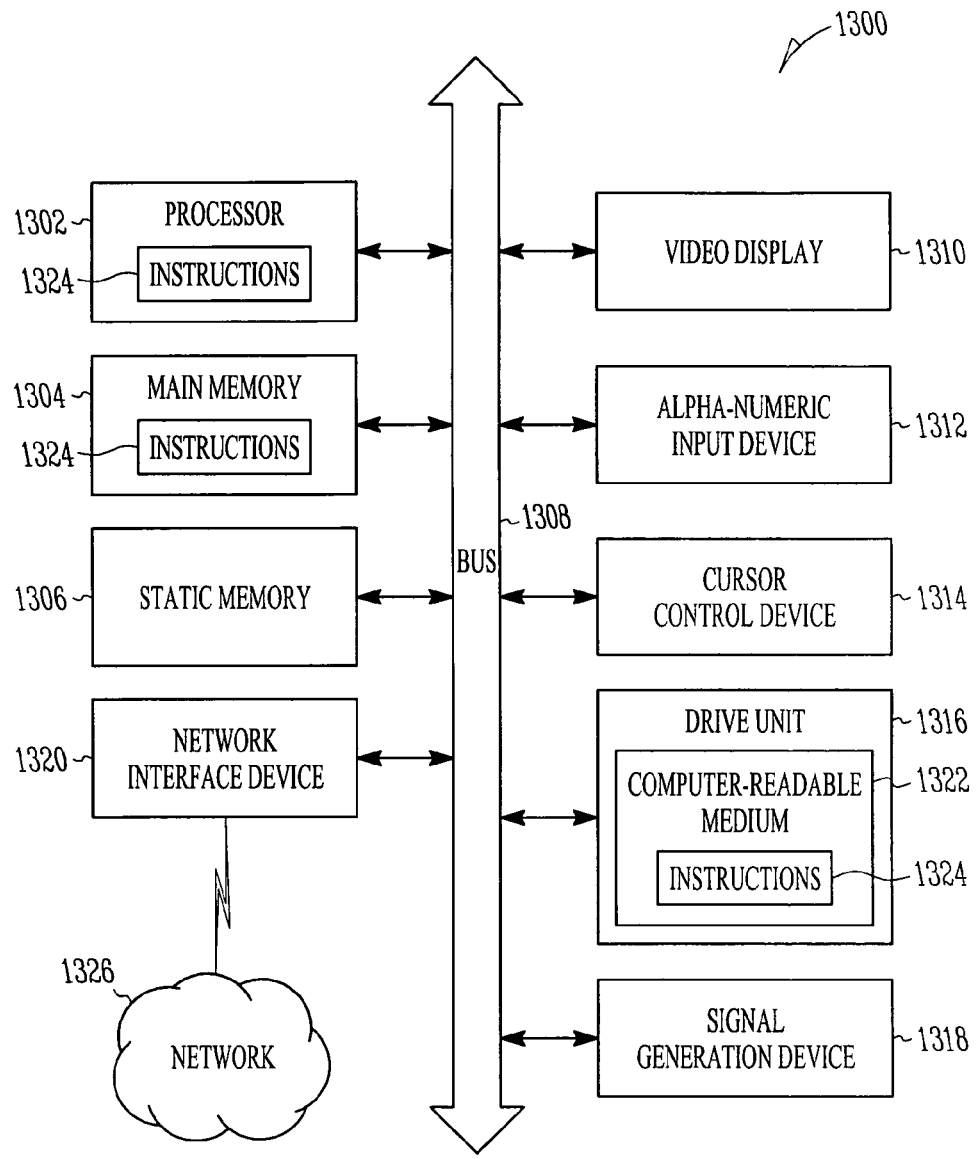
FIG. 13 is a block diagram of machine in the example form of a computer system within which instructions, for causing the machine to perform any one or more of the methodologies discussed herein, may be executed, in accordance with some example embodiments.

FIG. 13 is a block diagram of a machine in the example form of a computer system within which instructions, for causing the machine to perform any one or more of the methodologies discussed herein, may be executed, in accordance with some example embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software 1324) embodying or utilized by any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1324 may further be transmitted or received over a communications network 1326 using a transmission medium via the network interface device 1320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of evaluating a code base including a hierarchy of code modules, the method comprising:
   evaluating a first of the code modules at a first level of the hierarchy using a metric for measuring programming quality of a code module, deriving a score for the metric for the first of the code modules;
   evaluating a second of the code modules at a second level of the hierarchy using the metric, deriving a score for the metric for the second of the code modules;
   storing the score for the metric for the first of the code modules and the score for the metric for the second of the code modules in a first level of an evaluation hierarchy;
   normalizing the score for the metric for the first of the code modules and the score for the metric for the second of the code modules and storing the results in a second level of the evaluation hierarchy;
   evaluating one or more indicators based on the normalized score for the metric for the first of the code modules and the normalized score for the metric for the second of the code modules and storing the evaluation results in a third level of an evaluation hierarchy;
   calculating one or more index values based on the evaluation results of the one or more indicators and based on evaluation results of one or more other indicators;
   calculating a super index value based on the one or more index values and based on one or more other index values;
   evaluating programming quality of the code base, based at least in part on the super index value; and
   displaying the super index value to a user on a computer.

2. The method of claim 1, wherein the evaluating the first of the code modules and evaluating the second of the code modules are performed independently of other code modules of the hierarchy of code modules.

3. The method of claim 1, wherein the metric includes calculating at least one of a number of lines of code in the associated code module, a number of nested loops in the associated code module, or a number of lines of comment in the associated code module.

4. The method of claim 1, wherein the metric includes measuring code access as a function of at least one of time and diversity of individuals associated with the code access.

5. The method of claim 1, wherein the first metric includes measuring risks, other indicators, indices, or metrics with reference to the hierarchy.

6. The method of claim 1, wherein the first metric includes measuring risk indices or other indicators, metrics, indices and probability distribution related to the risk indices.

7. An apparatus to evaluate a code base including a hierarchy of code modules, the apparatus comprising:
   memory to store instructions; and
   one or more processors which, when executed by the processor perform operations including:
   evaluating a first of the code modules at a first level of the hierarchy using a metric for measuring programming quality of a code module, deriving a score for the metric for the first of the code modules;
   evaluating a second of the code modules at a second level of the hierarchy using the metric, and deriving a score for the metric for the second of the code modules; and
   storing the score for the metric for the first of the code modules and the score for the metric for the second of the code modules in a first level of an evaluation hierarchy;

normalizing the score for the metric for the first of the code modules and the score for the metric for the second of the code modules and storing the results in a second level of the evaluation hierarchy;

evaluating one or more indicators based on the normalized score for the metric for the first of the code modules and the normalized score for the metric for the second of the code modules and storing the evaluation results in a third level of an evaluation hierarchy;

calculating one or more index values based on the evaluation results of the one or more indicators and based on evaluation results of one or more other indicators;

calculating a super index values based on the one or more index values and based on one or more other index value;

evaluating programming quality of the code base, based at least in part on the super index value.

8. An apparatus to evaluate a code base including a hierarchy of code modules, the apparatus comprising:

means for evaluating a first of the code modules at a first level of the hierarchy using a metric for measuring programming quality of a code module, deriving a score for the metric for the first of the code modules;

means for evaluating a second of the code modules at a second level of the hierarchy using the metric, deriving a score for the metric for the second of the code modules;

means for storing the score for the metric for the first of the code modules and the score for the metric for the second of the code modules in a first level of an evaluation hierarchy;

means for normalizing the score for the metric for the first of the code modules and the score for the metric for the second of the code modules and storing the results in a second level of the evaluation hierarchy;

means for evaluating one or more indicators based on the normalized score for the metric for the first of the code modules and the normalized score for the metric for the second of the code modules and storing the evaluation results in a third level of an evaluation hierarchy;

means for calculating one or more index values based on the evaluation results of the one or more indicators and based on evaluation results of one or more other indicators;

means for calculating a super index value based on the one or more index values and based on one or more other index values; and means for evaluating programming quality of the code base, based at least in part on the super index value.

\* \* \* \* \*